(12) United States Patent
Takatsugi

(10) Patent No.: US 10,113,458 B2
(45) Date of Patent: Oct. 30, 2018

(54) OIL STRAINER

(71) Applicant: DaikyoNishikawa Corporation, Hiroshima (JP)

(72) Inventor: Kengo Takatsugi, Hiroshima (JP)

(73) Assignee: DaikyoNishikawa Corporation, Hiroshima (JP)

( * ) Notice: Subject to any disclaimer, the term of this patent is extended or adjusted under 35 U.S.C. 154(b) by 159 days.

(21) Appl. No.: 15/026,428

(22) PCT Filed: Apr. 15, 2015

(86) PCT No.: PCT/JP2015/002087
§ 371 (c)(1),
(2) Date: Mar. 31, 2016

(87) PCT Pub. No.: WO2015/159544
PCT Pub. Date: Oct. 22, 2015

(65) Prior Publication Data
US 2016/0245136 A1 Aug. 25, 2016

(30) Foreign Application Priority Data
Apr. 18, 2014 (JP) .................. 2014-086730

(51) Int. Cl.
*F01M 11/03* (2006.01)
*B01D 35/00* (2006.01)
*B01D 29/05* (2006.01)
*F01M 11/00* (2006.01)
*B01D 35/027* (2006.01)

(52) U.S. Cl.
CPC ............. *F01M 11/03* (2013.01); *B01D 29/05* (2013.01); *B01D 35/005* (2013.01); *B01D 35/0273* (2013.01); *F01M 11/0004* (2013.01); *F01M 2011/007* (2013.01)

(58) Field of Classification Search
CPC .. B01D 35/005; B01D 35/0273; B01D 29/01; B01D 35/28; B01D 2201/04; B01D 2201/184; B01D 2201/34
See application file for complete search history.

(56) References Cited

U.S. PATENT DOCUMENTS

| 8,157,105 | B2* | 4/2012 | Nishiyama | .......... F16H 57/0404 123/196 A |
| 9,784,149 | B2* | 10/2017 | Matsuda | ............ F01M 11/0004 |
| 2007/0163937 | A1 | 7/2007 | Sato | |
| 2007/0163948 | A1* | 7/2007 | Sato | ..................... B01D 27/005 210/455 |

(Continued)

FOREIGN PATENT DOCUMENTS

| JP | 2007-192140 A | 8/2007 |
| JP | 2007-192141 A | 8/2007 |
| JP | 2009-057886 A | 3/2009 |

(Continued)

OTHER PUBLICATIONS

International Search Report and Written Opinion issued in Application No. PCT/JP2015/002087, dated Jul. 14, 2015.

*Primary Examiner* — Ana M Fortuna
(74) *Attorney, Agent, or Firm* — Studebaker & Brackett PC

(57) ABSTRACT

An oil strainer 1 has a filter 10 and a casing 20. The casing 20 is provided with an oil inlet hole 43a and an oil outlet hole 33a. The frame 12 of the filter 10 is provided with a notch 12a.

4 Claims, 16 Drawing Sheets

(56) References Cited

U.S. PATENT DOCUMENTS

2015/0247431 A1 9/2015 Yuki et al.
2016/0245136 A1* 8/2016 Takatsugi ........... B01D 35/0273

FOREIGN PATENT DOCUMENTS

| JP | 2009-108765 A | 5/2009 |
| JP | 2012-127221 A | 7/2012 |
| WO | 2014/045545 A1 | 3/2014 |

* cited by examiner

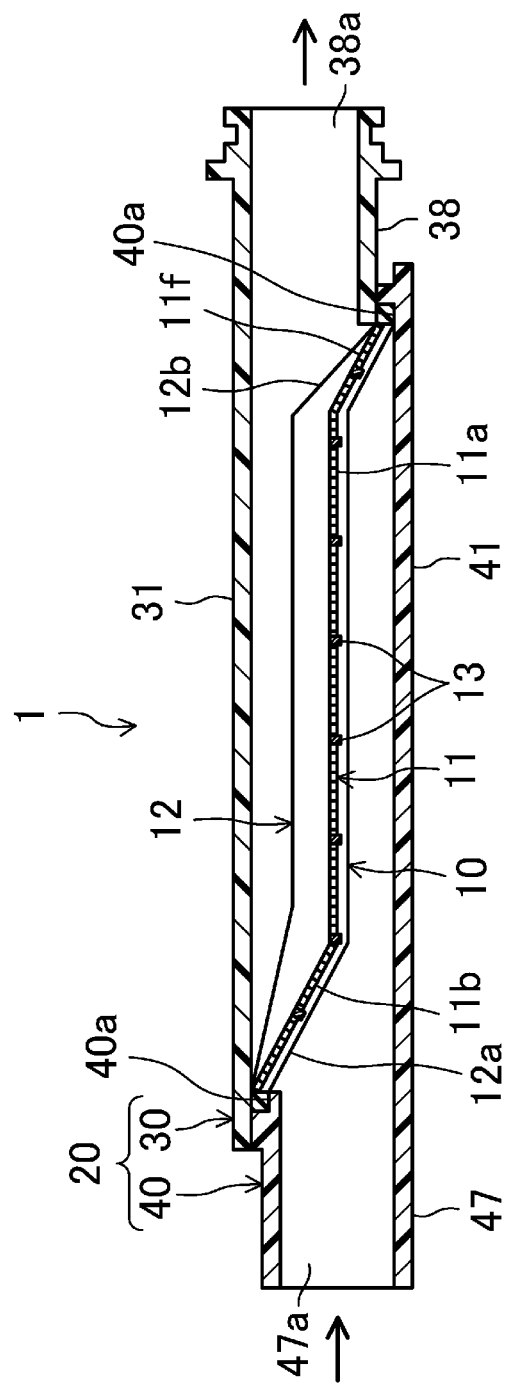

OIL STRAINER

TECHNICAL FIELD

The present invention relates to an oil strainer disposed in the oil pan of an engine mounted on a vehicle, for example.

BACKGROUND ART

Oil strainers for removing impurities and other substances contained in the oil have been disposed in the oil pan of an engine or a transmission, etc., of a vehicle (see, e.g., Patent Document 1). The oil strainer of Patent Document 1 has a filter and an elongated casing in which the filter is housed. The filter is comprised of a mesh portion in a plate-like shape, and a frame that surrounds the mesh portion. The mesh portion is reinforced by the frame and is supported on the casing. The casing is provided with an oil inlet hole and an oil outlet hole near the ends in its longitudinal direction. The oil which has flowed into the casing from the oil inlet hole is strained through the filter, and thereafter flows out from the oil outlet hole.

CITATION LIST

Patent Document

Patent Document 1: Japanese Unexamined Patent Publication No. 2012-127221

SUMMARY OF THE INVENTION

Technical Problem

Some oil pans have a shallow depth, and such an oil pan has a shorter vertical dimension for the space where the oil strainer is to be disposed. In some oil pans, the space where the oil strainer is to be disposed may also have a short vertical dimension, due to layouts of various components disposed in the oil pan. In such cases, the vertical dimension of the oil strainer, that is, the vertical dimension of the casing, needs to be shortened.

However, the casing is provided with the oil inlet hole and the oil outlet hole, of which the areas of openings cannot be too much reduced to prevent an increase in resistance of the oil flowing through the holes. Consequently, the oil inlet hole and oil outlet hole of a certain size need to be formed in the casing.

However, the filter has the frame as described above, and if the vertical dimension of the casing is reduced, the frame may be located close to the oil inlet hole and the oil outlet hole, and may close these holes. This may inhibit smooth flow of the oil, and lead to an increased flow resistance of the oil.

In view of the foregoing, it is therefore an objective of the invention to reduce a flow resistance of the oil in a casing having a reduced vertical dimension.

Solution to the Problem

To achieve the above objective, the present invention provides a notch at a frame of a filter.

A first aspect of the invention is directed to an oil strainer including a plate-like shaped filter which strains oil, and a casing which houses the filter. The oil strainer is configured to strain, through the filter, the oil which has flowed into the oil strainer from an oil inlet hole formed in the casing, and discharge the oil from an oil outlet hole formed in the casing. The filter has a mesh portion through which the oil passes, and a frame which surrounds a periphery of the mesh portion. The frame is provided with a notch.

According to this configuration, in the case where the thickness of the casing is reduced and the frame of the filter is to be located at a position where the frame interrupts the flow of the oil, the notch is provided at such a position, and the flow of the oil is therefore less likely to be interrupted by the frame.

A second aspect of the invention is an embodiment of the first aspect of the invention. In the second aspect, the notch is formed at a portion where the frame and the oil inlet hole (43a, 47a) or the oil outlet hole (33a, 37a, 38a) overlap each other when viewed along an oil flow direction.

According to this configuration, in the case where the frame and the oil inlet hole or the oil outlet hole are positioned such that they overlap each other when viewed along the oil flow direction, the frame is provided with the notch at the overlapped portion. Thus, the frame is less likely to interrupt the oil flowing into the casing from the oil inlet hole, and is also less likely to interrupt the oil flowing to the oil outlet hole from inside the casing.

A third aspect of the invention is an embodiment of the first aspect of the invention. In the third aspect, the filter has a first mesh portion and a second mesh portion which are apart from each other in a thickness direction of the filter, and a third mesh portion which extends in a direction along which the first mesh portion and the second mesh portion are apart from each other.

According to this configuration, the mesh portion has a three-dimensional shape formed by the first mesh portion, the second mesh portion, and the third mesh portion. This configuration allows for efficiently increasing the area of the filter for straining the oil in the casing.

A fourth aspect of the invention is an embodiment of the first aspect of the invention. In the fourth aspect, a plate-like portion which does not allow the oil to pass therethrough is provided in an area surrounded by the frame of the filter so as to face an inner surface of the casing, and at least one of the plate-like portion and the inner surface of the casing is provided with a projected portion which projects toward, and comes in contact with, the other one of the plate-like portion and the inner surface of the casing so as to prevent the oil from flowing into a space formed between the plate-like portion and the inner surface of the casing facing the plate-like portion.

According to this configuration, in the case where the projected portion is formed at the plate-like portion of the filter, the projected portion comes in contact with the inner surface of the casing, thereby preventing the oil from flowing into the space formed between the plate-like portion and the inner surface of the casing facing the plate-like portion. Similarly, also in the case where the projected portion is formed at the inner surface of the casing, the oil is prevented from flowing into the space formed between the plate-like portion and the inner surface of the casing facing the plate-like portion.

Advantages of the Invention

In the first aspect of the invention, the frame of the filter is provided with a notch. This allows for positioning the frame such that it does not interrupt the flow of the oil. Thus, the flow resistance of the oil can be reduced.

In the second aspect of the invention, the frame is less likely to interrupt the oil flowing into the casing from the oil inlet hole, and is less likely to interrupt the oil flowing to the oil outlet hole from inside the casing. Thus, the flow resistance of the oil can be reduced.

In the third aspect of the invention, a third mesh portion extending in the direction along which the first and second mesh portions of the filter are apart from each other is provided. This configuration allows for efficiently increasing the area of the filter for straining the oil in the casing. As a result, the oil strainer with high straining properties can be downsized.

In the fourth aspect of the invention, at least one of the plate-like portion and the inner surface of the casing is provided with a projected portion which projects toward, and comes in contact with, the other one of the plate-like portion and the inner surface of the casing. By this projected portion, the oil is prevented from flowing into the space formed between the plate-like portion and the inner surface of the casing. This configuration reduces the generation of turbulence of the oil in the space between the plate-like portion and the inner surface of the casing facing the plate-like portion. As a result, the flow resistance of the oil can be reduced.

BRIEF DESCRIPTION OF THE DRAWINGS

FIG. 20 illustrates an eighth embodiment corresponding to FIG. 4.

DESCRIPTION OF EMBODIMENTS

Embodiments of the present invention will now be described in detail with reference to the drawings. The following embodiments are merely preferred examples in nature, and are not intended to limit the scope, applications, and use of the invention.

(First Embodiment)

Figure 1:
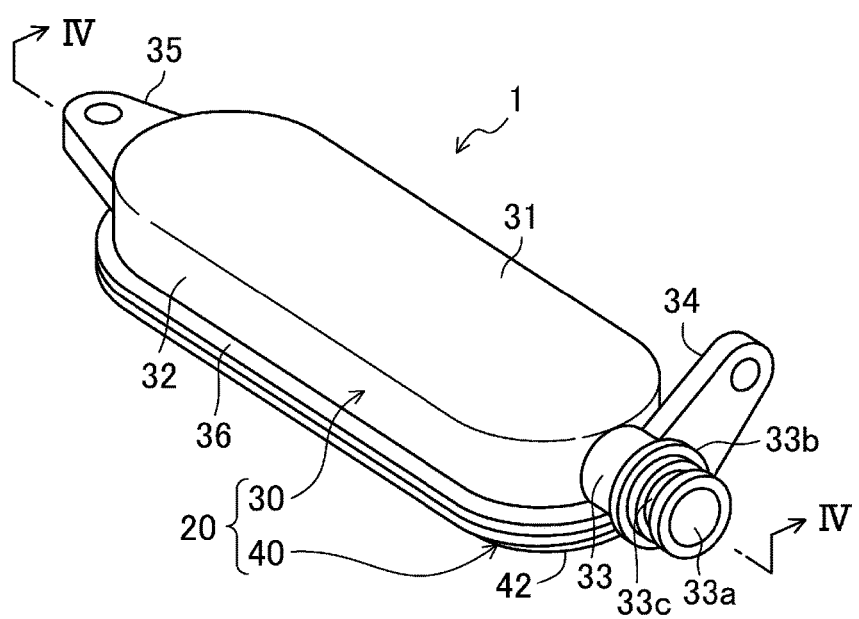
FIG. 1 is a perspective view of an oil strainer, viewed from above, according to a first embodiment.

FIG. 1 is a perspective view of an oil strainer 1, viewed from above, according to an embodiment of the present invention. The oil strainer 1 is disposed, for example, in the oil pan (not shown) of the engine mounted on an automobile, and is configured to be able to strain impurities contained in the oil which circulates in the engine. The oil strainer 1 of the present embodiment is applicable to the case where the oil pan is shallow, or the case where the space in the oil pan where the oil strainer 1 is to be disposed has a short vertical dimension due to various components disposed in the oil pan. Note that the oil strainer 1 can be disposed not only in the oil pan of the engine, but also in the oil pan of an automatic transmission, for example.

The oil strainer 1 has a plate-like filter (illustrated in FIG. 4) 10 which strains the oil, and a casing 20 in which the filter 10 is housed. The casing 20 as a whole is thin according to the vertical dimension of the space where the oil strainer 1 is to be disposed, and the casing 20 is formed into an elongated shape extending in a longitudinal direction or a lateral direction of the vehicle. In this embodiment, the casing 20 extends approximately in a horizontal direction, but the direction is not limited to the horizontal direction, and the casing 20 may be tilted. The casing 20 may also be bent in plan view.

The casing 20 is comprised of an upper half body 30 and a lower half body 40, which are combined together at an intermediate portion, in the vertical direction, of the casing 20. The upper half body 30 and the lower half body 40 are both formed by molding a resin material.

Figure 4:
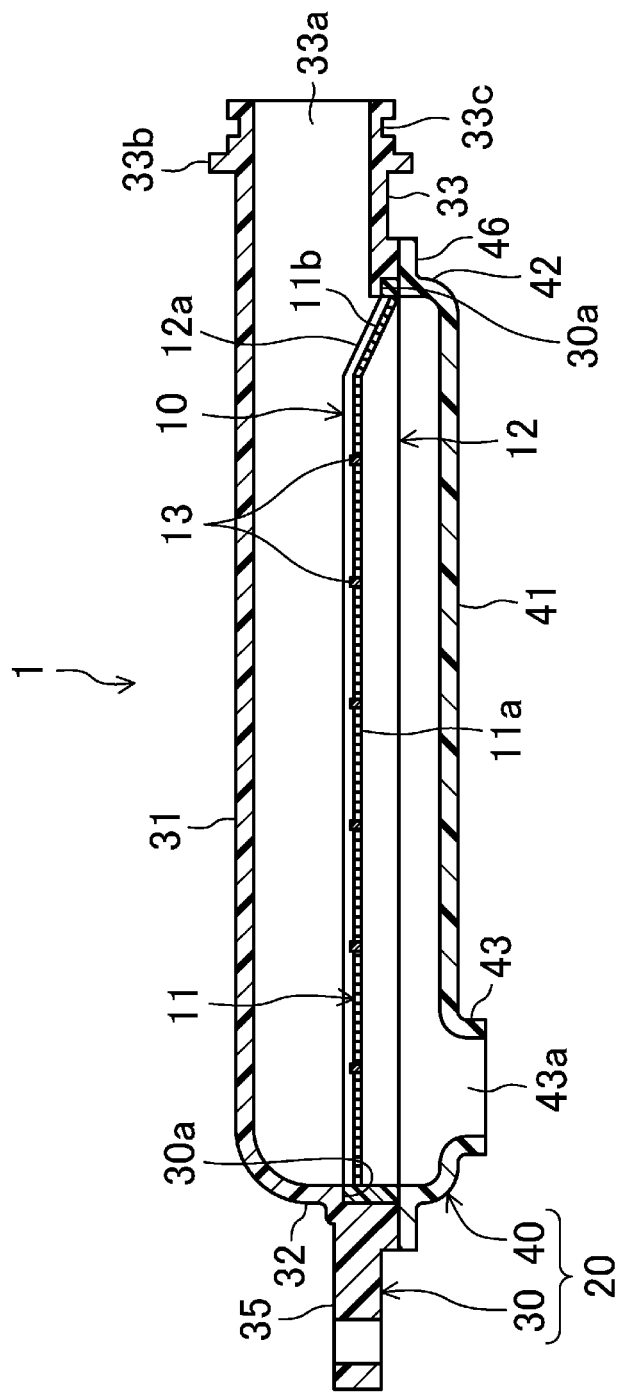
FIG. 4 is a cross-sectional view taken along the plane IV-IV of FIG. 1.

The upper half body 30 has an upper wall portion 31 extending in the longitudinal direction of the casing 20, and a circumferential wall portion 32 extending downward from the peripheral edge of the upper wall portion 31. The upper half body 30 is open downward. The circumferential wall portion 32 is provided with an oil outlet pipe portion 33 on one end, in the longitudinal direction, of the casing 20. The oil outlet pipe portion 33 communicates with the interior of the casing 20, and projects approximately in the horizontal direction along the longitudinal dimension of the casing 20. As illustrated in FIG. 4, the upper portion of the oil outlet pipe portion 33 is level with the upper wall portion 31. This structure allows for reducing the vertical dimension of the casing 20 including the oil outlet pipe portion 33.

Figure 2:
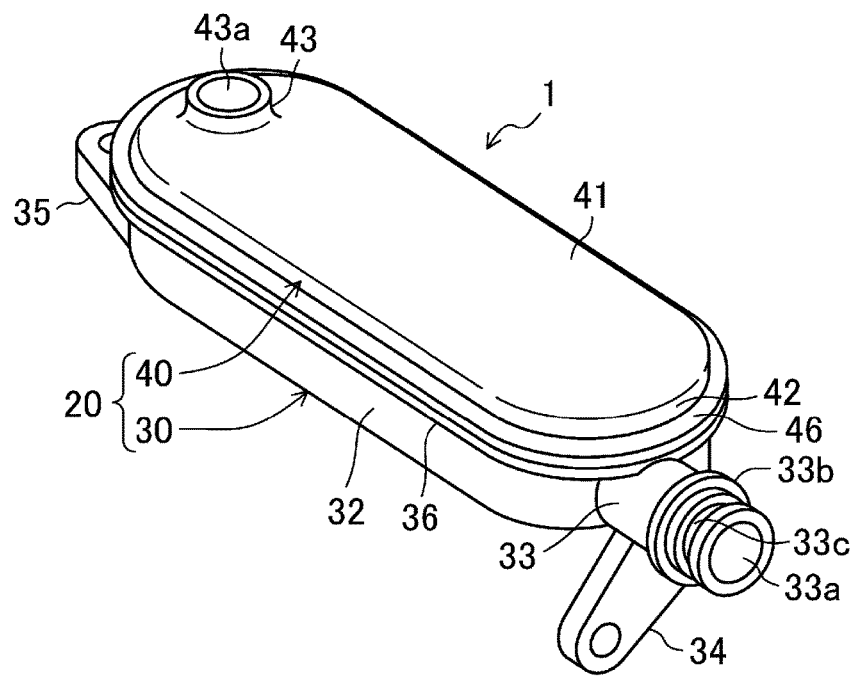
FIG. 2 is a perspective view of the oil strainer, viewed from below, according to the first embodiment.

An oil outlet hole 33a is provided in the interior of the oil outlet pipe portion 33. The oil outlet hole 33a extends in the approximately horizontal direction along the longitudinal dimension of the casing 20. Thus, the oil outlet direction is along the longitudinal dimension of the casing 20. A flange 33b is provided on the outer surface of the oil outlet pipe portion 33 at a position spaced from the distal end of the oil outlet pipe portion 33 toward the proximal end thereof. As illustrated in FIGS. 1 and 2, the outer surface of the oil outlet pipe portion 33 is provided with a groove 33c at a position closer to the distal end than the flange 33b is. The groove 33c is continuous along the circumference of the oil outlet pipe portion 33, and is configured such that a sealing member, not shown, is fitted in the groove 33c. Although not shown, the oil outlet pipe portion 33 is inserted in, and hence connected to, for example, an oil suction hole formed in the cylinder block of an engine, and thereby communicating with an oil pump.

A first attachment portion 34 is formed at a proximal end portion of the outer surface of the oil outlet pipe portion 33 so as to project from the proximal end portion. Further, a second attachment portion 35 is formed on the circumferential wall portion 32 of the upper half body 30 on the other end, in the longitudinal direction, of the casing 20 so as to project from that portion. The first attachment portion 34 and the second attachment portion 35 are fastened to the engine. In addition, an upper welding flange 36 is formed at the lower end of the circumferential wall portion 32 of the upper half body 30. The upper welding flange 36 projects outward from the upper half body 30, and extends in the circumferential direction of the circumferential wall portion 32.

Figure 3:
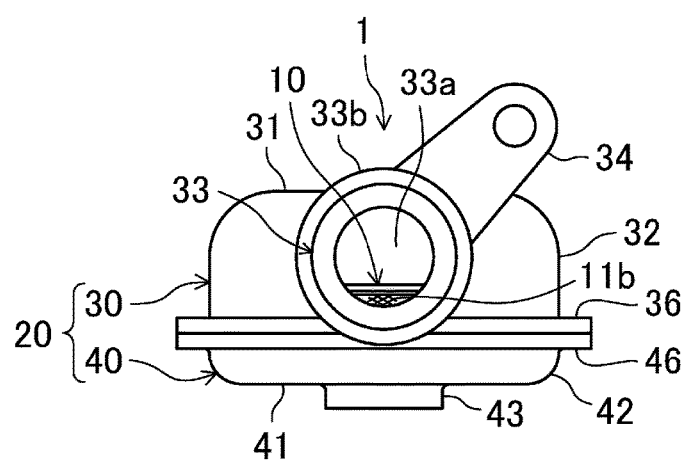
FIG. 3 is an end view of the oil strainer, viewed from an oil outlet hole side, according to the first embodiment.

The lower half body 40 has a lower wall portion 41 extending in the longitudinal direction of the casing 20, and a circumferential wall portion 42 extending upward from the peripheral edge of the lower wall portion 41. The lower half body 40 is open upward. The lower wall portion 41 can be formed so as to extend approximately in parallel with the upper wall portion 31, but is not limited thereto. The lower wall portion 41 may also be formed such that it curves along the shape of the interior of the oil pan. As illustrated in FIGS. 3 and 4, the vertical dimension of the circumferential wall portion 42 of the lower half body 40 is designed to be smaller than the vertical dimension of the circumferential wall portion 32 of the upper half body 30.

The lower wall portion 41 is provided with a tubular potion 43 on the other end, in the longitudinal direction, of the casing 20 so as to communicate with the interior of the casing 20. The tubular potion 43 projects downward from the lower wall portion 41. The length of projection of the tubular potion 43 is designed such that the lower end of the tubular potion 43 is located near the bottom wall of the oil pan. In this embodiment, the vertical dimension of the space where the oil strainer 1 is to be disposed is small. Thus, the length of the tubular potion 43 is also short. The tubular potion 43 has an oil inlet hole 43a therein. The oil inlet hole 43a extends in the vertical direction.

A lower welding flange 46 is formed at the upper end of the circumferential wall portion 42 of the lower half body 40. The lower welding flange 46 is welded to the upper welding flange 36 of the upper half body 30. The lower welding flange 46 projects outward from the lower half body 40, and extends along the upper welding flange 36. Although not shown, each of the lower surface of the upper welding flange 36 and the upper surface of the lower welding flange 46 may be provided with a raised linear portion for welding. These raised linear portions for welding can be vibration welded, for example.

Further, as illustrated in FIG. 4, the inner surface of the upper half body 30 of the casing 20 has a step portion 30a to which the frame 12 of the filter 10 is fitted. The step portion 30a extends so as to surround the opening on the bottom of the upper half body 30.

Figure 5:
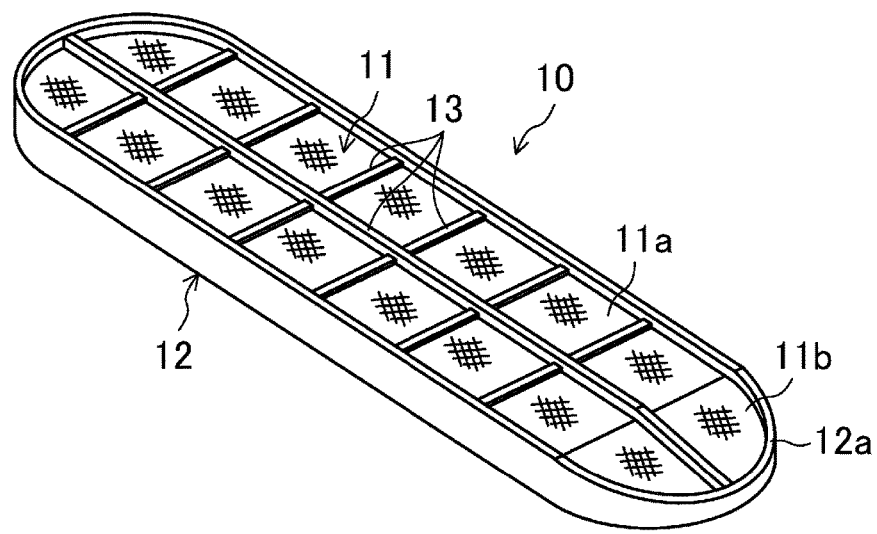
FIG. 5 is a perspective view of a filter, viewed from above.
Figure 6:
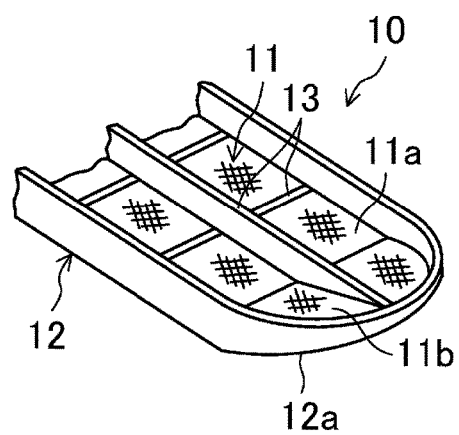
FIG. 6 is a perspective view of the filter on the side where a notch is formed, viewed from below.

As illustrated in FIGS. 5 and 6, the filter 10 has a mesh portion 11 through which the oil passes, a frame 12 which surrounds the periphery of the mesh portion 11, and ribs 13 which reinforce the mesh portion 11. The filter 10 is an integrally formed member made of a resin material. The mesh portion 11 as a whole extends in the longitudinal direction of the casing 20, that is, from the upstream side of the oil flow (i.e., from near the oil inlet hole 43a of the casing 20) to the downstream side of the oil flow (i.e., to near the oil outlet hole 33a of the casing 20). The mesh portion 11 has a large number of holes which are small enough to strain impurities contained in the oil.

The mesh portion 11 is comprised of an upstream mesh portion 11a extending in the oil flow direction, and a downstream mesh portion 11b. In the filter 10, the upstream mesh portion 11a extends from the end of the other side, in the longitudinal direction, of the casing 20 to close to the end of the one side of the casing 20, and is arranged approximately in parallel with the upper wall portion 31 and the lower wall portion 41. The downstream mesh portion 11b extends from the edge of the upstream mesh portion 11a to the end of the one side, in the longitudinal direction, of the casing 20. The downstream mesh portion 11b is tilted downward to the end of the one side, in the longitudinal direction, of the casing 20. Thus, the mesh portion 11 is bent at the boundary between the upstream mesh portion 11a extending in the oil flow direction and the downstream mesh portion 11b tilting with respect to the oil flow direction. Further, the upstream mesh portion 11a and the downstream mesh portion 11b are both approximately flat.

The height of the upstream mesh portion 11a is designed such that the upstream mesh portion 11a overlaps with the oil outlet hole 33a when viewed from the downstream side opening of the oil outlet hole 33a along the oil flow direction. Of the downstream mesh portion 11b, a portion closer to the upstream mesh portion 11a also overlaps with the oil outlet hole 33a when viewed from the downstream side opening of the oil outlet hole 33a along the oil flow direction.

The frame 12 is in a circular shape, and is configured to be fitted to the step portion 30a (shown in FIG. 4) of the upper half body 30. In the state in which the frame 12 is fitted to the step portion 30a, the bottom surface of the frame 12 is brought into contact with, and hence supported by, the top surface of the lower half body 40. The frame 12 is therefore prevented from wobbling.

The frame 12 is provided with a notch 12a on the one side, in the longitudinal direction, of the casing 20. The notch 12a is formed at a portion, of the frame 12, which surrounds the downstream mesh portion 11b, by cutting off an upper portion of the frame 12. The edge of the notch 12a is tilted downward toward the one side, in the longitudinal direction, of the casing 20. That is, the notch 12a gradually deepens along the tilt of the downstream mesh portion 11b.

The portion of the frame 12 where the notch 12a is formed is a portion at which the frame 12 and the oil outlet hole 33a overlap each other when viewed along the oil flow direction. Thus, the frame 12 does not close the upstream side opening of the oil outlet hole 33a. In other words, this structure prevents the area of the upstream side opening of the oil outlet hole 33a from being smaller than the cross-sectional area of the oil outlet hole 33a. Thus, the frame 12 is less likely to interrupt the oil flowing to the oil outlet hole 33a from inside the casing 20.

The plurality of ribs 13 are spaced from each other in the longitudinal direction of the filter 10. The ribs 13 and the mesh portion 11 are integrally formed.

In the oil strainer 1 having the above configuration, the oil in the oil pan flows into the casing 20 from the oil inlet hole 43a. The oil which has flowed into the casing 20 flows upward and toward the one side, in the longitudinal direction, of the casing 20, and passes and is strained through the mesh portion 11 of the filter 10. The strained oil passes through the oil outlet hole 33a, and is sucked by the oil pump. The oil in the casing 20 generally flows along the longitudinal direction of the casing 20 and flows into the oil outlet hole 33a when it flows out from the casing 20, since the oil outlet hole 33a extends in the longitudinal direction of the casing 20. In the course of flowing out, the frame 12 of the filter 10 is less likely to interrupt the oil flowing to the oil outlet hole 33a from inside the casing 20, since the frame 12 is provided with the notch 12a on the side closer to the oil outlet hole 33a.

In this manner, according to the oil strainer 1 of the present embodiment, the frame 12 is less likely to interrupt the oil flowing to the oil outlet hole 33a from inside the casing 20. This allows for reducing a flow resistance of the oil.

(Second Embodiment)

Figure 7:
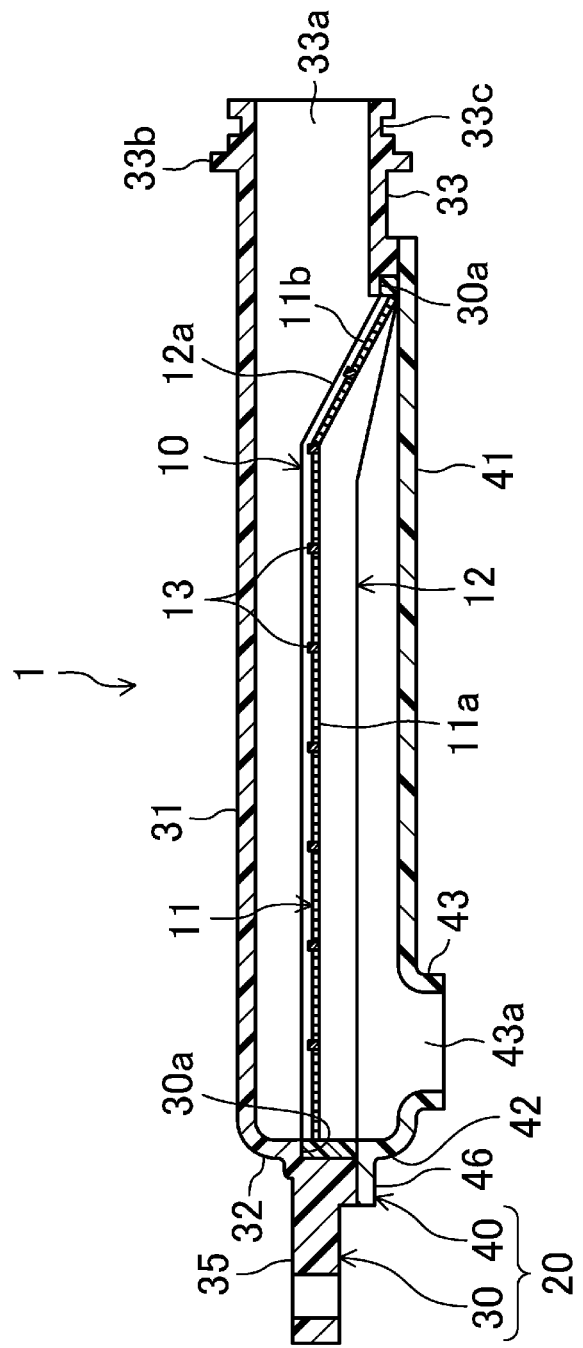
FIG. 7 illustrates a second embodiment corresponding to FIG. 4.
Figure 8:
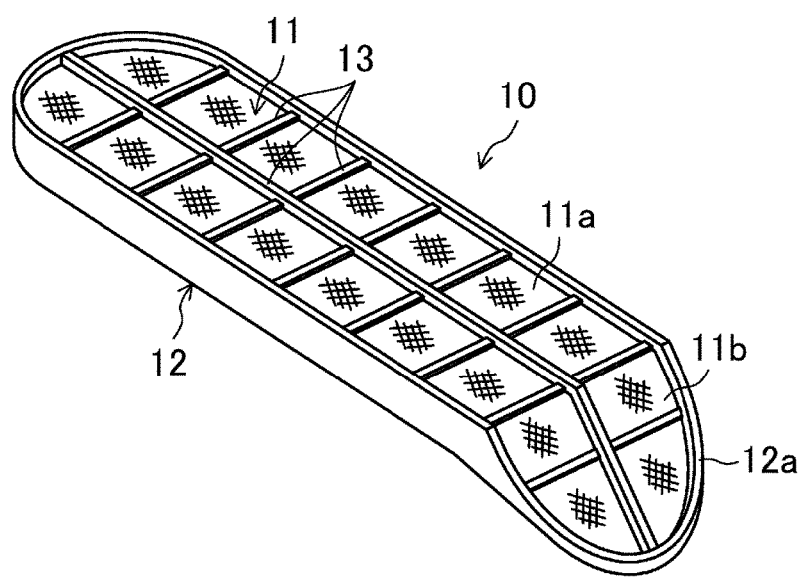
FIG. 8 illustrates the second embodiment corresponding to FIG. 5.

FIGS. 7 and 8 illustrate the oil strainer 1 according to a second embodiment of the present invention. The oil strainer 1 of the second embodiment differs from the oil strainer 1 of the first embodiment only in the shapes of the filter 10 and the casing 20, and the basic structure is the same as that of the first embodiment. Thus, in the following description, the same reference characters are used to designate the same elements as those in the first embodiment, and the explanation thereof is omitted.

In the second embodiment, the length of the downstream mesh portion 11b of the filter 10 (i.e., the longitudinal dimension of the casing 20) is increased, and the tilt angle of the downstream mesh portion 11b is also increased. The frame 12 surrounding the downstream mesh portion 11b extends downward to correspond to this shape of the mesh portion 11. Further, the area of the portion of the frame 12 where the notch 12a is formed is larger than such an area in the first embodiment, due to an increased length of the downstream mesh portion 11b.

The oil strainer 1 of the second embodiment, too, is configured such that the frame 12 is less likely to interrupt the oil flowing to the oil outlet hole 33a from inside the casing 20, and therefore has the same or similar advantages as/to those in the first embodiment.

(Third Embodiment)

Figure 9:
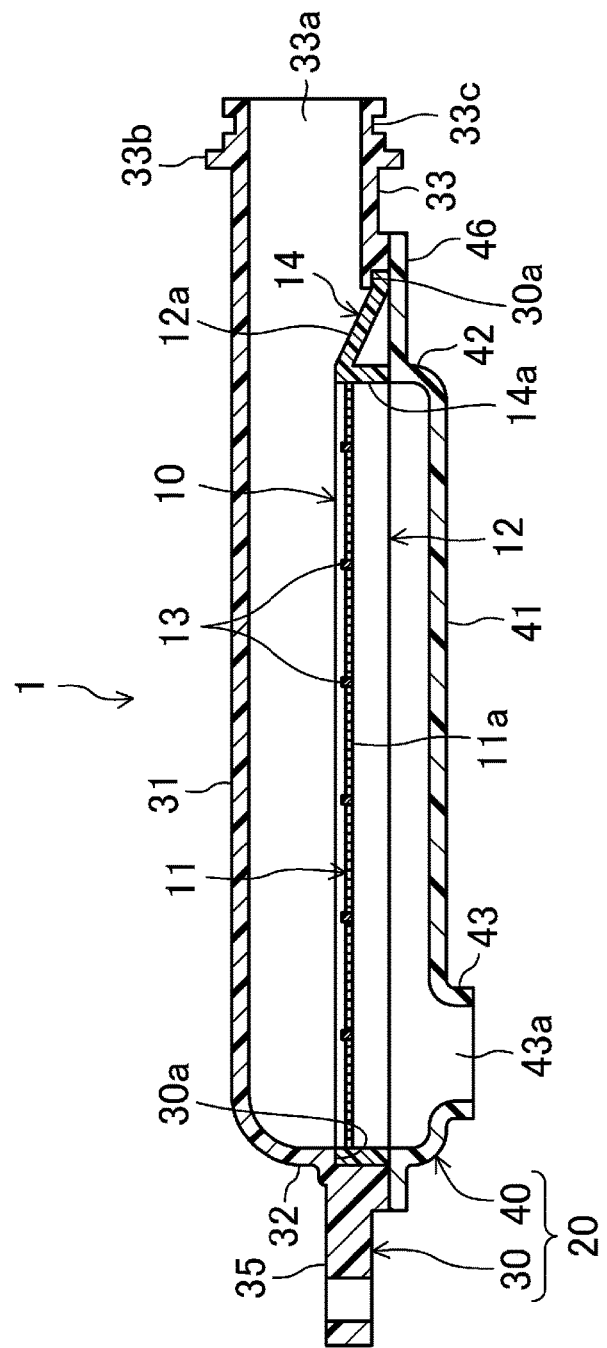
FIG. 9 illustrates a third embodiment corresponding to FIG. 4.
Figure 10:
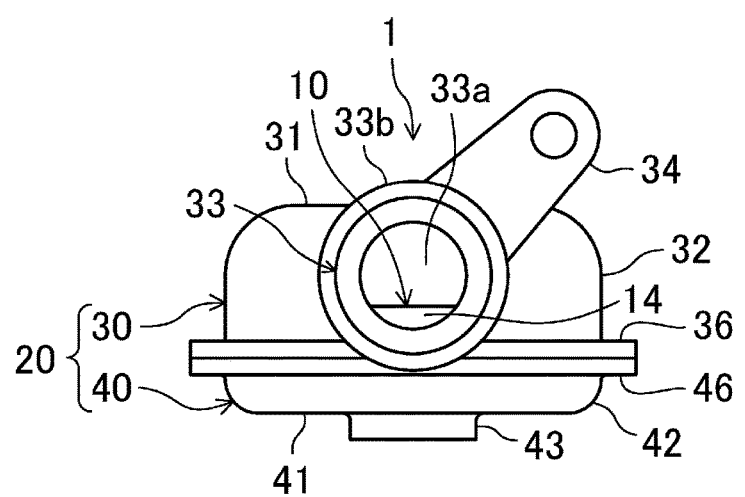
FIG. 10 illustrates the third embodiment corresponding to FIG. 3.

FIGS. 9 and 10 illustrate the oil strainer 1 according to a third embodiment of the present invention. The oil strainer 1 of the third embodiment differs from the oil strainer 1 of the first embodiment only in the shapes of the filter 10 and the casing 20, and the basic structure is the same as that of the first embodiment. Thus, in the following description, the same reference characters are used to designate the same elements as those in the first embodiment, and the explanation thereof is omitted.

In the third embodiment, the downstream mesh portion 11b is not provided. Instead, a plate-like portion 14 which does not allow the oil to pass therethrough is provided in an area surrounded by the frame 12 of the filter 10. The plate-like portion 14 faces the bottom surface (the inner surface) of the casing 20, and tilts downward toward the oil outlet hole 33a, similarly to the downstream mesh portion 11b of the first embodiment. The peripheral portion of the plate-like portion 14 is continuous with the inner surface of the frame 12.

The edge of the notch 12a of the frame 12 is along the peripheral portion of the plate-like portion 14. Accordingly, the frame 12 is provided with the notch 12a at a portion where the frame 12 and the oil outlet hole 33a overlap each other when viewed along the oil flow direction.

Further, the lower surface of the plate-like portion 14 is provided with a projected portion 14a which projects toward the bottom surface of the casing 20 and comes in contact with the bottom surface. The projected portion 14a is located adjacent to the edge of the plate-like portion 14 close to the mesh portion 11, and is configured to prevent the oil from flowing into a space formed between the plate-like portion 14 and the lower surface of the casing 20 facing the plate-like portion 14.

The oil strainer 1 of the third embodiment, too, is configured such that the frame 12 is less likely to interrupt the oil flowing to the oil outlet hole 33a from inside the casing 20, and therefore has the same or similar advantages as/to those in the first embodiment.

Further, generation of turbulence of the oil can be reduced in the space formed between the plate-like portion 14 and the lower surface of the casing 20, since the oil is less likely to flow into the space formed between the plate-like portion 14 and the lower surface of the casing 20.

In the third embodiment, the projected portion 14a is formed on the lower surface of the plate-like portion 14, but is not limited thereto. A projected portion (not shown) may be formed on the lower surface of the casing 20 so as to project toward the plate-like portion 14 and come in contact with the plate-like portion 14.

(Fourth Embodiment)

Figure 11:
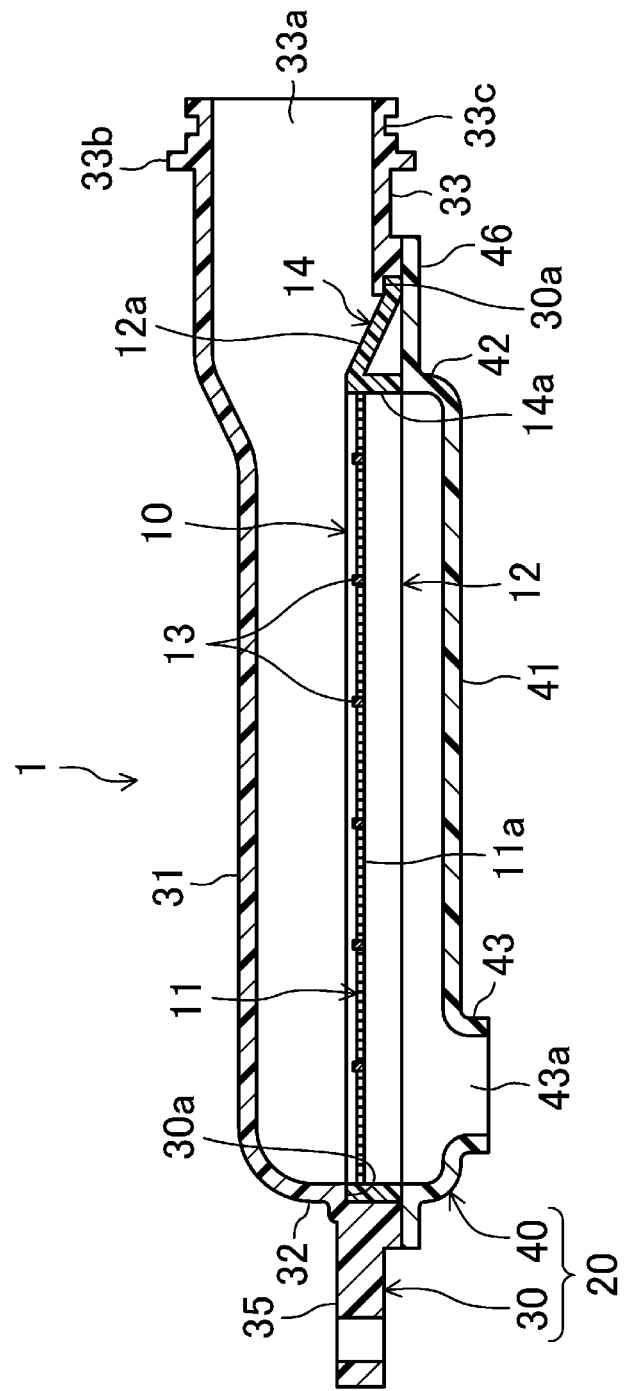
FIG. 11 illustrates a fourth embodiment corresponding to FIG. 4.
Figure 12:
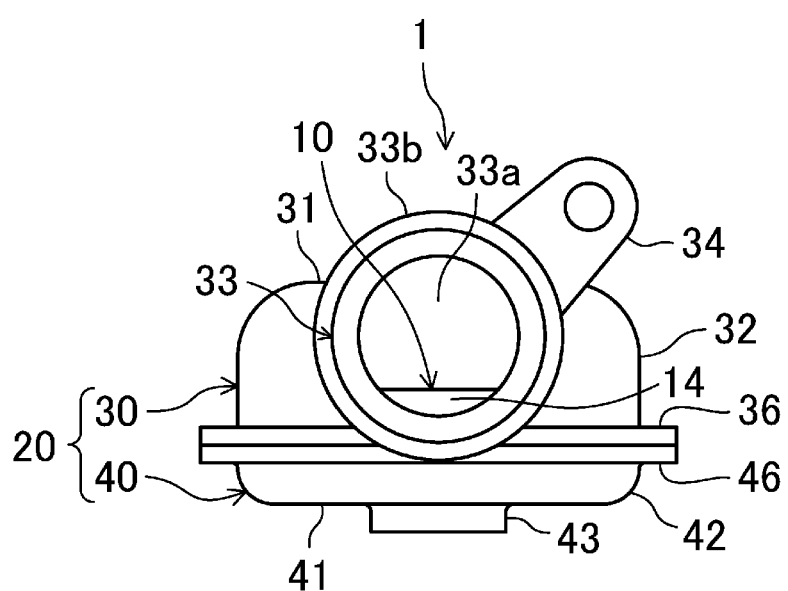
FIG. 12 illustrates the fourth embodiment corresponding to FIG. 3.

FIGS. 11 and 12 illustrate the oil strainer 1 according to a fourth embodiment of the present invention. The oil strainer 1 of the fourth embodiment differs from the oil strainer 1 of the third embodiment only in the shape of the casing 20, and the basic structure is the same as that of the third embodiment. Thus, the same reference characters are used to designate the same elements as those in the third embodiment, and the explanation thereof is omitted.

In the fourth embodiment, the diameter of the oil outlet pipe portion 33 is greater than the diameters of the oil outlet pipe portions 33 of the first to third embodiments, and the oil outlet pipe portion 33 is designed such that the upper portion thereof is greater in height than the upper wall portion 31.

The oil strainer 1 of the fourth embodiment, too, is configured such that the frame 12 is less likely to interrupt the oil flowing to the oil outlet hole 33a from inside the casing 20, and therefore has the same or similar advantages as/to those in the first embodiment.

(Fifth Embodiment)

Figure 13:
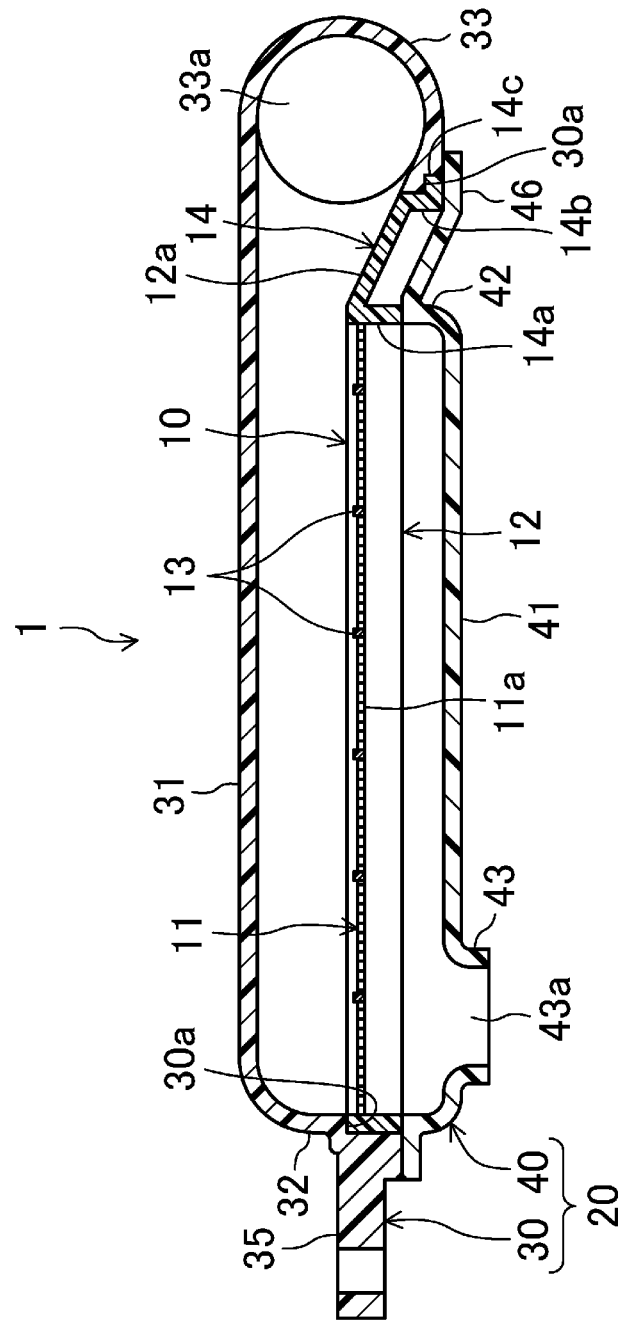
FIG. 13 illustrates a fifth embodiment corresponding to FIG. 4.

FIG. 13 illustrates the oil strainer 1 of a fifth embodiment of the present invention. The oil strainer 1 of the fifth embodiment differs from the oil strainer 1 of the first embodiment only in the shapes of the filter 10 and the casing 20, and the basic structure is the same as that of the first embodiment. Thus, in the following description, the same reference characters are used to designate the same elements as those in the first embodiment, and the explanation thereof is omitted.

In the fifth embodiment, the oil outlet pipe portion 33 extends in the direction intersecting with the longitudinal direction of the casing 20 (i.e., extends in the direction perpendicular to the sheet of FIG. 13).

Further, the filter 10 of the fifth embodiment is provided with a plate-like portion 14 similar to the plate-like portion 14 of the third embodiment. The edge of the notch 12a of the frame 12 is along the peripheral portion of the plate-like portion 14. The frame 12 is provided with the notch 12a at a portion where the frame 12 and the oil outlet hole 33a overlap each other when viewed along the oil flow direction.

Further, a projected portion 14a is formed on the lower surface of the plate-like portion 14 at the edge adjacent to the mesh portion 11. The projected portion 14a projects toward the bottom surface of the casing 20 and comes in contact with the bottom surface. Further, the plate-like portion 14 is provided, at a distal end portion thereof, with an extended portion 14b which extends downward, and a protrusion 14c which protrudes in the longitudinal direction of the casing 20 from the extended portion 14b. In the state in which the protrusion 14c is fitted to the step portion 30a of the upper half body 30, the protrusion 14c and the frame 12 are supported by the lower half body 40 from below.

The oil strainer 1 of the fifth embodiment, too, is configured such that the frame 12 is less likely to interrupt the oil flowing to the oil outlet hole 33a from inside the casing 20, and therefore has the same or similar advantages as/to those in the first embodiment.

(Sixth Embodiment)

Figure 14:
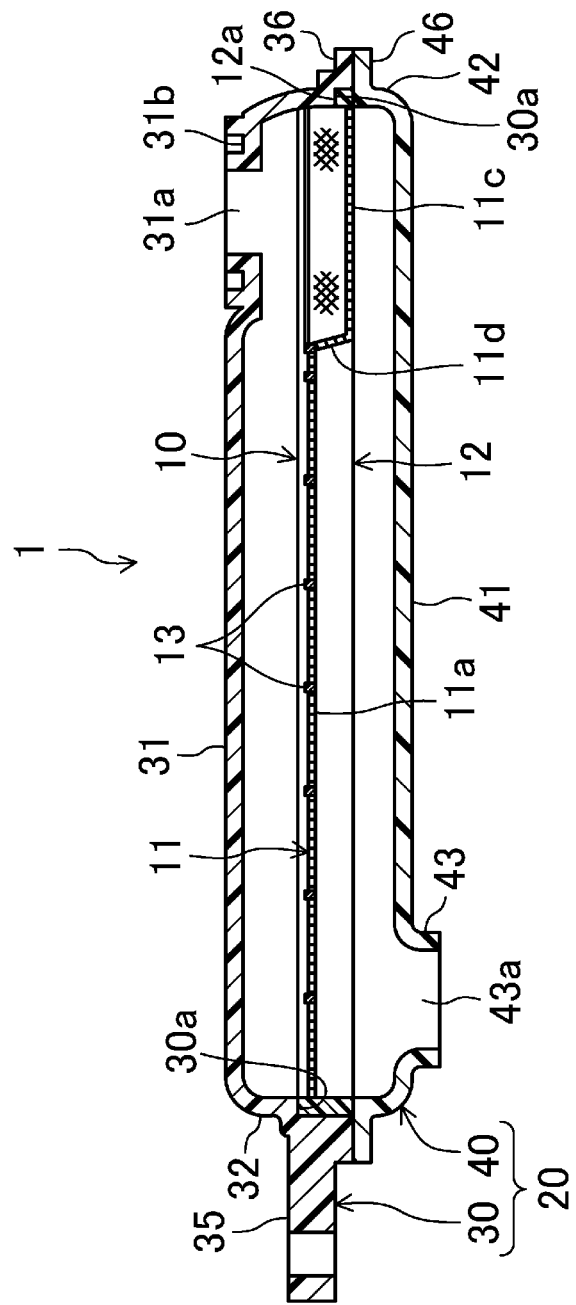
FIG. 14 illustrates a sixth embodiment corresponding to FIG. 4.
Figure 15:
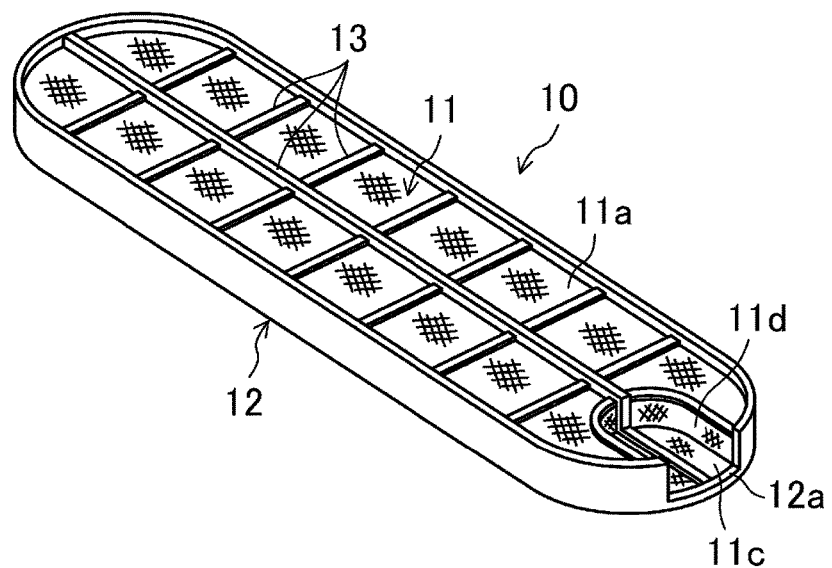
FIG. 15 illustrates the sixth embodiment corresponding to FIG. 5.
Figure 16:
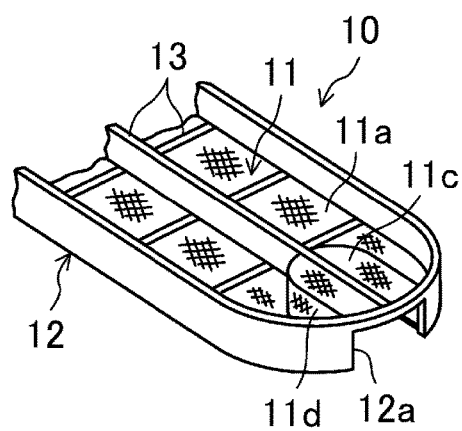
FIG. 16 illustrates the sixth embodiment corresponding to FIG. 6.

FIGS. 14 to 16 illustrate the oil strainer 1 according to a sixth embodiment of the present invention. The oil strainer 1 of the sixth embodiment differs from the oil strainer 1 of the first embodiment only in the shapes of the filter 10 and the casing 20, and the basic structure is the same as that of the first embodiment. Thus, in the following description, the same reference characters are used to designate the same elements as those in the first embodiment, and the explanation thereof is omitted.

In the sixth embodiment, an oil outlet hole 31a is formed in the upper wall portion 31 of the upper half body 30. The oil outlet hole 31a extends vertically. A groove 31b to which a sealing member (not shown) is fitted is formed in the upper wall portion 31 around the oil outlet hole 31a.

The frame 12 of the filter 10 is provided with a notch 12a at a location corresponding to the oil outlet hole 31a. As illustrated in FIG. 15, the notch 12a has an approximately square U-shape which opens upward. Cutting off the portion of the frame 12 which corresponds to the oil outlet hole 31a allows for ensuring a larger space on the oil outlet side and allowing the oil to easily flow into the oil outlet hole 31a, without increasing the size of the casing 20.

The mesh portion 11 has a first mesh portion 11a and a second mesh portion 11c which are apart from each other in the thickness direction of the filter 10, and a third mesh portion 11d which extends in the direction along which the first mesh portion 11a and the second mesh portion 11c are apart from each other. The second mesh portion 11c is located below the first mesh portion 11a, and is continuous with a lower edge portion of the notch 12a. The third mesh portion 11d extends upward from the peripheral portion of the second mesh portion 11c, and is continuous with the first mesh portion 11a. The third mesh portion 11d is also continuous with both side edge portions of the notch 12a. The mesh portion 11 therefore has a three-dimensional shape, which increases the area for straining.

The oil strainer 1 of the sixth embodiment has the third mesh portion 11d, and therefore allows for ensuring a larger space on the upstream side of the oil outlet hole 31a. As a result, the flow resistance of the oil can be reduced.

Figure 17:
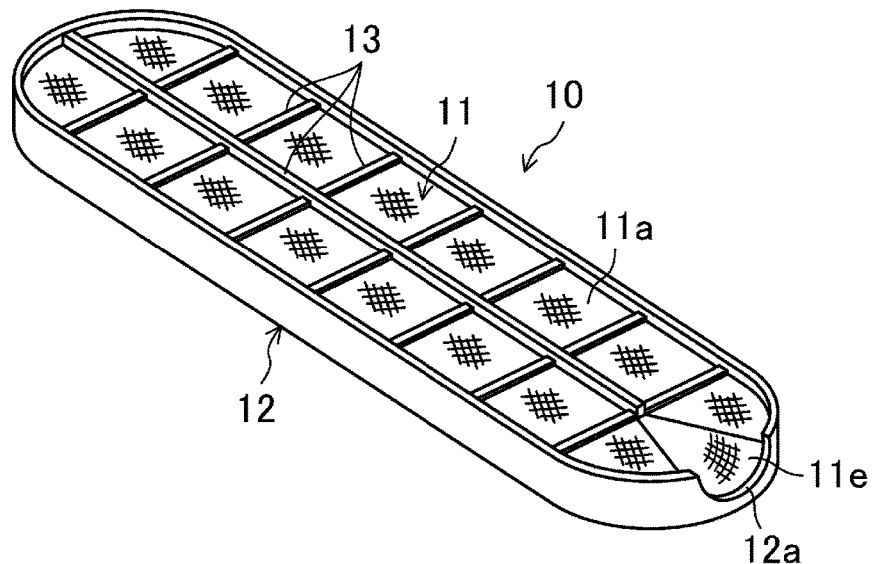
FIG. 17 illustrates a variation of the sixth embodiment corresponding to FIG. 5.
Figure 18:
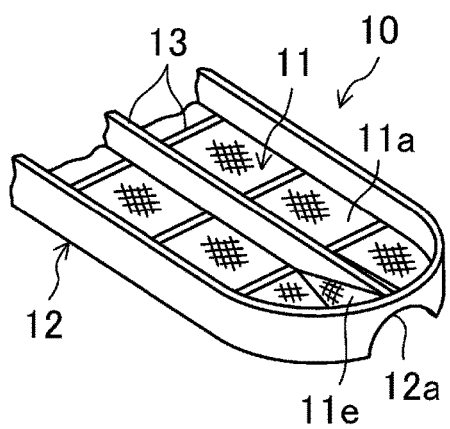
FIG. 18 illustrates the variation of the sixth embodiment corresponding to FIG. 6.

As shown in the variation illustrated in FIGS. 17 and 18, the notch 12a of the frame 12 may be formed such that the peripheral portion of the notch 12a is curved. To correspond to this curved shape, a curved mesh portion 11e may be formed. Further, the curved mesh portion 11e may be a plate-like portion which does not allow the oil to pass therethrough.

(Seventh Embodiment)

Figure 19:
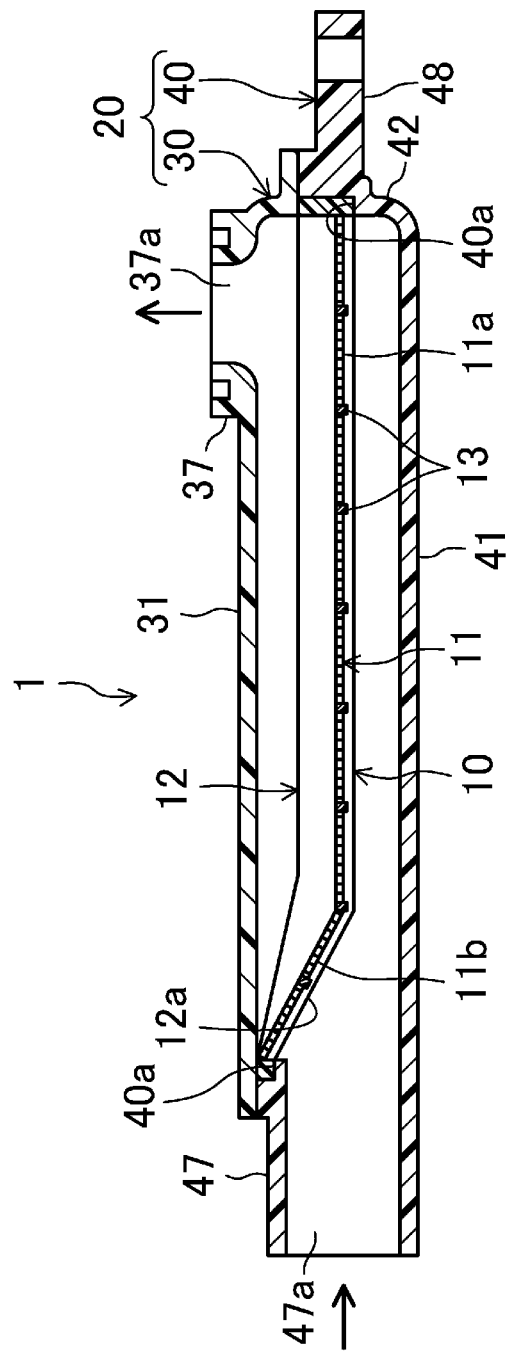
FIG. 19 illustrates a seventh embodiment corresponding to FIG. 4.

FIG. 19 illustrates the oil strainer 1 according to a seventh embodiment of the present invention. The oil strainer 1 of the seventh embodiment differs from the oil strainer 1 of the first embodiment only in the shapes of the filter 10 and the casing 20, and the basic structure is the same as that of the first embodiment. Thus, in the following description, the same reference characters are used to designate the same elements as those in the first embodiment, and the explanation thereof is omitted.

In the seventh embodiment, a tubular potion 37 is formed on the upper wall portion 31 of the upper half body 30. The tubular potion 37 has an oil outlet hole 37a therein. The oil outlet hole 37a extends in the vertical direction. Further, the circumferential wall portion 42 of the lower half body 40 is provided with an oil inlet pipe portion 47. The oil inlet pipe portion 47 has an oil inlet hole 47a therein. The oil inlet hole 47a extends in the longitudinal direction of the casing 20. The inner surface of the lower half body 40 has a step portion 40a to which the frame 12 is fitted.

The frame 12 of the filter 10 is provided with a notch 12a on its oil inlet side. The notch 12a is formed at a portion, of the frame 12, which surrounds the downstream mesh portion 11b, by cutting off a lower portion of the frame 12. The portion of the frame 12 where the notch 12a is formed is a portion at which the frame 12 and the oil inlet hole 47a overlap each other when viewed along the oil flow direction. Thus, the frame 12 is less likely to interrupt the oil flowing into the casing 20 from the oil inlet hole 47a. As a result, the flow resistance of the oil can be reduced.

(Eighth Embodiment)

FIG. 20 illustrates the oil strainer 1 according to an eighth embodiment of the present invention. The oil strainer 1 of the eighth embodiment differs from the oil strainer 1 of the first embodiment only in the shapes of the filter 10 and the casing 20, and the basic structure is the same as that of the first embodiment. Thus, in the following description, the same reference characters are used to designate the same elements as those in the first embodiment, and the explanation thereof is omitted.

In the eighth embodiment, the casing 20 is provided with an oil inlet pipe portion 47 similar to the oil inlet pipe portion 47 of the seventh embodiment. Further, the circumferential wall portion 32 of the upper half body 30 is provided with an oil outlet pipe portion 38 which extends in the longitudinal direction of the casing 20. The oil outlet pipe portion 38 has an oil outlet hole 38a therein.

The frame 12 of the filter 10 is provided with a notch 12a similar to the notch 12a of the sixth embodiment at a portion closer to the oil inlet hole 47a. The frame 12 is also provided with a notch 12b similar to the notch 12b of the second embodiment at a portion closer to the oil outlet hole 38a.

Thus, according to the oil strainer 1 of the eighth embodiment, the frame 12 is less likely to interrupt the oil flowing into the casing 20 from the oil inlet hole 47a, and the frame 12 is less likely to interrupt the oil flowing to the oil outlet hole 38a from inside the casing 20. As a result, the flow resistance of the oil can be reduced.

The first to eighth embodiments are the cases in which the shape of the casing 20 is straight, but the casing 20, including a filter housing portion, may be approximately L-shaped, U-shaped, C-shaped, or S-shaped, for example.

Further, the casing 20, including the filter-housing portion, may be tilted such that the oil outlet hole is positioned higher than the oil inlet hole.

The foregoing embodiments are merely examples in all aspects, and should not be restrictively interpreted. All the modifications and changes which come within the scope equivalent to the scope of the appended claims are within the scope of the present invention.

INDUSTRIAL APPLICABILITY

As can be seen from the foregoing description, the oil strainer of the present invention can be used, for example, to strain the oil of the engine of an automobile.

DESCRIPTION OF REFERENCE CHARACTERS

1 Oil Strainer
10 Filter

11 Mesh Portion
11a Mesh Portion (First Mesh Portion)
11c Mesh Portion (Second Mesh Portion)
11d Mesh Portion (Third Mesh Portion)
12 Frame
12a, 12b Notch
14 Plate-Like Portion
14a Projected Portion
20 Casing
33a, 37a, 38a Oil Outlet Hole
43a, 47a Oil Inlet Hole

The invention claimed is:

1. An oil strainer, comprising:
a plate-like shaped filter which strains oil; and
a casing which houses the filter, the casing is formed in an elongated shape extending in a longitudinal direction, and
the oil strainer being configured to strain, through the filter, the oil which has flowed into the oil strainer from an oil inlet hole formed in the casing at an upstream end portion along the longitudinal direction, and discharge the oil from an oil outlet hole formed in the casing at a downstream end portion along the longitudinal direction, wherein
the filter is formed in a shape extending in the longitudinal direction, having an upstream end portion and a downstream end portion in the longitudinal direction,
the filter has a mesh portion through which the oil passes, and a frame which surrounds a periphery of the mesh portion, and
the frame is provided with a notch at the downstream end portion of the frame where the frame and the oil outlet hole overlap each other when viewed along an oil flow direction,
the notch is formed such that a cross-sectional area of an oil inlet path increases toward the oil inlet hole, and such that a cross-sectional area of an oil outlet path increases toward the oil outlet hole, and
the notch is shaped such that the upstream side of the oil outlet hole is larger than the cross-sectional area of the oil outlet hole.

2. The oil strainer of claim 1, wherein
the filter has a first mesh portion and a second mesh portion which are apart from each other in a thickness direction of the filter, and a third mesh portion which extends in a direction along which the first mesh portion and the second mesh portion are apart from each other.

3. The oil strainer of claim 1, wherein
the filter is provided with a plate-like portion which does not allow the oil to pass therethrough in an area surrounded by the frame so as to face an inner surface of the casing, and
at least one of the plate-like portion and the inner surface of the casing is provided with a projected portion which projects toward, and comes in contact with, the other one of the plate-like portion and the inner surface of the casing so as to prevent the oil from flowing into a space formed between the plate-like portion and the inner surface of the casing facing the plate-like portion.

4. The oil strainer of claim 1, wherein
the edge of the notch is tilted downward towards the oil outlet hole such that the upstream side of the oil outlet hole is larger than the cross-sectional area of the oil outlet hole.

* * * * *